(12) United States Patent
Hodges

(10) Patent No.: US 8,510,346 B2
(45) Date of Patent: Aug. 13, 2013

(54) EFFICIENTLY HANDLING INFORMATION ON CHANGES TO A UDDI REGISTRY INCLUDING THOSE RESULTING IN VIRTUAL DELETES

(75) Inventor: Ian Mark Hodges, Horton Heath (GB)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 12/045,306

(22) Filed: Mar. 10, 2008

(65) Prior Publication Data

US 2008/0222210 A1    Sep. 11, 2008

(30) Foreign Application Priority Data

Mar. 9, 2007  (EP) ..................................... 07103863

(51) Int. Cl.
*G06F 7/00* (2006.01)
*G06F 17/30* (2006.01)
(52) U.S. Cl.
USPC .......................................................... 707/803
(58) Field of Classification Search
USPC ............................ 707/741, 803, 804, 999.101
See application file for complete search history.

(56) References Cited

U.S. PATENT DOCUMENTS

| | | | | |
|---|---|---|---|---|
| 7,457,815 B2 * | 11/2008 | Hsu et al. ................................. | 1/1 |
| 8,019,653 B1 * | 9/2011 | Frederick et al. ............. | 705/26.1 |
| 2002/0143819 A1 * | 10/2002 | Han et al. ....................... | 707/513 |
| 2004/0235563 A1 | 11/2004 | Blackburn et al. | |
| 2004/0237042 A1 * | 11/2004 | Murray et al. ................. | 715/530 |
| 2004/0242329 A1 | 12/2004 | Blackburn et al. | |
| 2005/0164704 A1 * | 7/2005 | Winsor ....................... | 455/432.3 |
| 2006/0047742 A1 * | 3/2006 | O'Neill et al. ................. | 709/203 |
| 2006/0251125 A1 * | 11/2006 | Goring et al. ................. | 370/503 |
| 2007/0116224 A1 * | 5/2007 | Burke et al. ............. | 379/201.12 |
| 2008/0155038 A1 * | 6/2008 | Bachmann et al. ........... | 709/206 |
| 2008/0263212 A1 * | 10/2008 | Goix et al. ..................... | 709/228 |

OTHER PUBLICATIONS

"BEA AquaLogic Service Registry 2.0 Product Documentation", Systinet 2001-2005, pp. 129-133, 219-224, Jan. 2006.
"BEA AquaLogic Service Registry Release Notes, Release 2.0.1", BEA Systems, Inc., pp. 1-4, Jan. 2006.
Bellwood, T., et al., "UDDI Version 3.0, UDDI Spec Technical Committee Specification", pp. 1, 124-133, 142-167, Jan. 19, 2002.

* cited by examiner

*Primary Examiner* — Brannon W Smith
(74) *Attorney, Agent, or Firm* — Patents on Demand P.A.; Brian K. Buchheit; Scott M. Garrett

(57) ABSTRACT

One aspect of the present invention can include a method, a computer program product, an apparatus, and a system for handling Universal Description, Discovery and Integration (UDDI) updates to entities. The aspect can receive at least one update to be applied to a UDDI entity within a UDDI registry. Each received update can be applied to the related UDDI entity. At least one subscriber of the updated entity can be determined. A status indicator for each detected subscriber can be changed to indicate that a subscription to the entity has been deleted, wherein the change to the status indicator negates a need to scan the subscriptions associated with the entity for each received update to the entity.

17 Claims, 6 Drawing Sheets

Match Table 80

| Entity Key | Subscription Key | Deleted | Inserted | Updated | Delivered |
|---|---|---|---|---|---|
| service1 | Subscription 1 | 0 | 0 | 1 | 0 |
| service2 | Subscription 2 | 0 | 1 | 0 | 0 |
| service3 | Subscription 3 | 0 | 0 | 1 | 1 |
| service1 | Subscription 4 | 0 | 0 | 1 | 0 |

Match Table 80

| Entity Key | Subscription Key | Deleted | Inserted | Updated | Delivered |
|---|---|---|---|---|---|
| service1 | Subscription 1 | 0 | 0 | 1 | 0 |
| service2 | Subscription 2 | 0 | 1 | 0 | 0 |
| service3 | Subscription 3 | 0 | 0 | 1 | 1 |
| service1 | Subscription 4 | 0 | 0 | 1 | 0 |

EFFICIENTLY HANDLING INFORMATION ON CHANGES TO A UDDI REGISTRY INCLUDING THOSE RESULTING IN VIRTUAL DELETES

CROSS-REFERENCE TO RELATED APPLICATION

This application claims the benefit of European Patent Application No. No. 07103863.2 filed 9 Mar. 2007 and which is hereby incorporated by reference.

BACKGROUND OF THE INVENTION

The present invention relates to the field of UDDI registries and, more particularly, to efficiently handling information on changes to a UDDI registry including those resulting in virtual deletes.

Over recent years it has become commonplace for a business to provide a web site on the Internet which, for example, enables a web client to purchase goods from that business over the World Wide Web.

More recently, it has become necessary to handle more complex e-business applications on the Internet which, for example, enable business communication. This requirement has been satisfied by the arrival of web services. Web services are modular and enhanced e-business applications that enable programmatic interaction between applications across the Internet. That is, a web service is a modular software component designed to support interoperable machine-to-machine interaction over a network. The software component can be described via a Web service description language (WSDL) and can be capable of being accessed via standard network protocols, such as but not limited to Service Oriented Architecture Protocol (SOAP) over Hyper Text Transfer Protocol (HTTP).

The ability for a customer to locate an appropriate web service has been enabled by the arrival of registry services. Universal Description, Discovery and Integration (UDDI) provides a standardised way of specifying web services and is described in the Oasis UDDI specification.

A UDDI registry enables a business to publish information about the services it provides. Accordingly a user can send a request to the UDDI registry to obtain details of services which provide a particular service which the user requires. The user then chooses from one or more services for which details are returned by the UDDI registry and sends an appropriate request to the chosen service.

Once a user has located appropriate web services, that user may subscribe via a subscription API to be notified of changes to the services listed in the UDDI registry (e.g., the addition of new services, a service update or a service deletion). Such subscriptions may be scoped using selection criteria. For example, a subscriber may be interested in stock quote services only.

A number of actions can be performed with respect to an entity in a UDDI registry. These action, collectively referred to as a UDDI change action, include creating a new entity, updating an existing entity, and deleting an existing entity. When an entity is updated, one or more aspects or attributes of the entity change.

Since subscription filters may exist which are dependent upon these changed attributes, updating an entity can have a side effect of changing a set of subscribers to an updated entity. A virtual delete occurs when a subscription is "deleted" because a set of pre-existing filters (that don't change) which were valid for an entity before an update to that entity change so that the subscription is no longer valid. Thus, from a subscriber view point, the subscription involving the entity has been indirectly or virtually deleted.

Conventional mechanisms to handle virtual delete situations are triggered each time an update action is performed against a UDDI entry. The triggered action checks each subscription to the entity to determine if any of the subscriptions, which may include filters, is invalidated by the change. When the change negatively affected a subscription, the subscriber is typically notified of the fact. This conventional mechanism is very processor intensive, since each change to a UDDI registered entity necessitated a significant amount of processing. Notably, the processing required checking for invalidated subscriptions is an XML driven one, which required the XML to be parsed each time and required a database inquiry be made for each update.

BRIEF SUMMARY OF THE INVENTION

One aspect of the present invention can include a method, a computer program product, an apparatus, and a system for handling Universal Description, Discovery and Integration (UDDI) updates to entities. The aspect can receive at least one update to be applied to a UDDI entity within a UDDI registry. Each received update can be applied to the related UDDI entity. At least one subscriber of the updated entity can be determined. A status indicator for each detected subscriber can be changed to indicate that a subscription to the entity has been deleted, wherein the change to the status indicator negates a need to scan the subscriptions associated with the entity for each received update to the entity.

Another aspect of the present invention can include a method, a computer program product, an apparatus, and a system for capturing information on changes in a UDDI registry. In this aspect, an update can be received to be applied to an entity with a UDDI registry. A match table can be used to determine whether there is a subscriber interested in the entity for which the update has been received. The match table can list those entities within the UDDI registry which are of interest to one or more subscribers. For each subscriber listed in the match table for which an interested in the entity is determined, a status indicator for the entity can be established to indicate that a subscription between the subscriber and the entity has been deleted.

BRIEF DESCRIPTION OF THE SEVERAL VIEWS OF THE DRAWINGS

FIG. 5 illustrates, in accordance with a preferred embodiment, the match table of FIG. 1a in more detail.

FIG. 6 provides, in accordance with a preferred embodiment, a more detailed illustration of the additional components hosted by the system of FIG. 1a.

DETAILED DESCRIPTION OF THE INVENTION

Figure 1A:
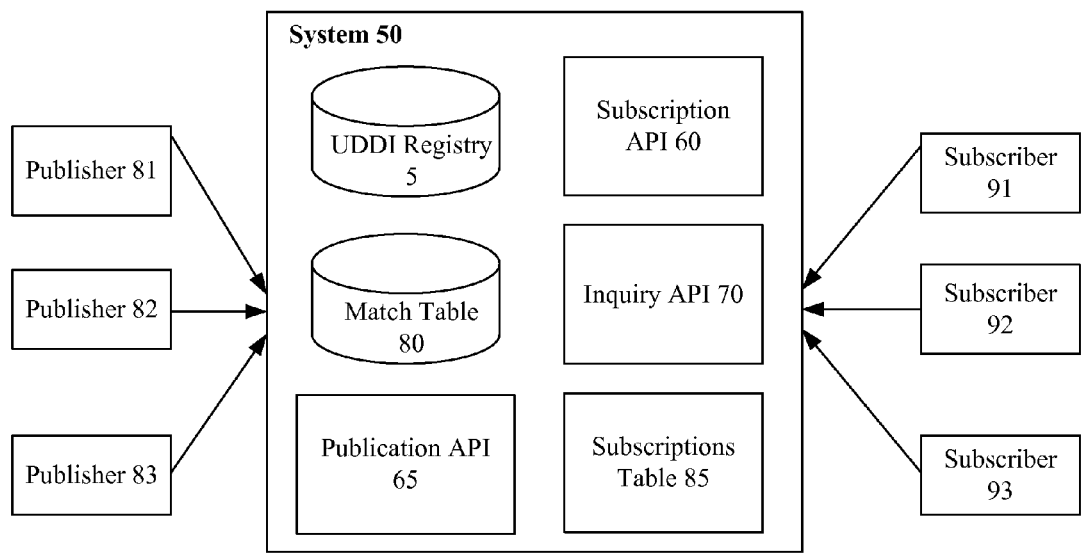
FIG. 1a provides an overview of a system providing UDDI services in accordance with a preferred embodiment of the present invention.

The present invention discloses a solution for handling UDDI entity updates, which doesn't require each update action to trigger a scanning of the entire UDDI registry for possible subscription issues (e.g., virtual deletes that result in subscribers of an entity using subscription filters from no longer being valid subscribers, since the update affected the conditions evaluated by the subscription filters). Accordingly to the solution, when an update to an entity occurs, that entity is immediately marked as "deleted" for subscription purposes. At this same time, new entities can be continuously added to a UDDI registry (as a result of a creation processes). These newly created entities have to be compared against a set of pre-existing subscription filters to determine if the new entities match any of these filters, which results in a subscription being established. The solution permits both new entities and those "deleted" through update actions to be scanned at the same time (in batch). Further, those subscriptions having changed subscription filter criteria can be checked at the same time (assuming a change to the subscription filter also causes a subscription to an entity to be marked as deleted). Thus, a scan shows those UDDI entities that "newly" satisfy the subscription filter criteria.

In other words, "virtually deleted subscriptions" remain deleted (this time permanently) and those updates (changes made to attributes of a UDDI entity) that didn't result in a virtual deletion are re-enabled as "new subscriptions." The flag that marked the updated subscriptions as deleted can be examined so that no message is sent to subscribers when a previous subscription to an updated entity remains viable. Also, the flag can be examined to ensure a notification is sent to those subscribers when a virtual delete resulted in a deletion of the subscription and when a new entity has been added to a subscription. Further, routines can be added to ensure that when an explicit subscriber request for a "deleted" subscription occurs, a determination can be made only to that specific description to determine if it remains viable or if it has been deleted through the update. The method described above can result in the same functional behavior as existing systems, yet requires significantly fewer scans of the subscription (traditionally a scan is required for each update), which saves substantial computing resources.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figures 5, 6:
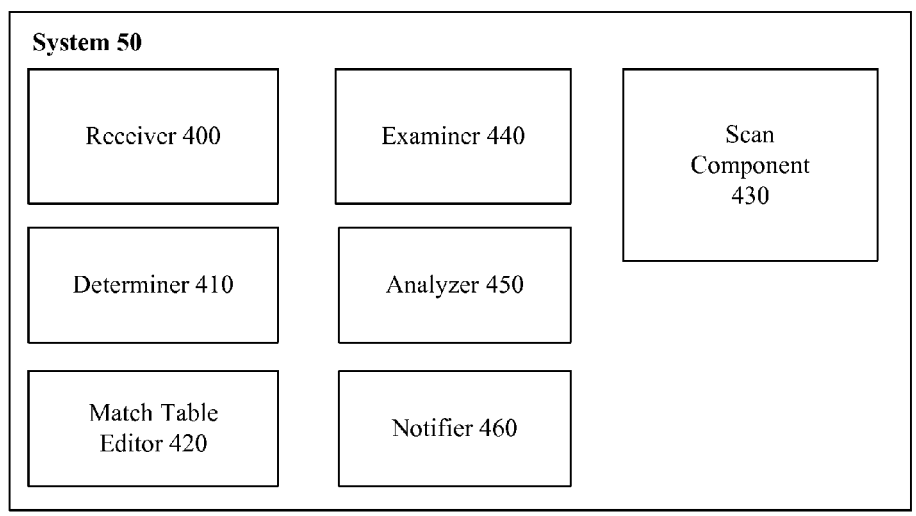

As discussed above, users may subscribe to be notified of 'interesting' changes to a UDDI registry that includes changes or updates that affect a subscription status, which can be a subscription based upon one or more subscription filters. FIG. 1a provides a simplified overview of a system 50 providing UDDI registry services. FIG. 6 provides a more detailed look at system 50 and illustrates the additional components provided by system 50 but not shown (for ease of explanation) in FIG. 1a.

System 50 comprises UDDI registry 5. The registry 5 can contain information about web services provided by businesses, organizations, individuals, or other party. Such businesses (publishers 81, 82, 83) may, via publish API 65, publish information about new services that they offer, they may update the information listed about services that they offer and they may delete services that are no longer on offer. Users may request information from the UDDI registry 5 on a one-time basis via inquiry API 70. Alternatively, subscribers 91, 92, 93 may subscribe (via subscription API 80) to be informed of 'interesting' insertions, update and deletions to the UDDI registry 5. Criteria for what is 'interesting' can be programmatically defined. For example, an interesting change to the registry 5 may be denoted by means of selection criteria (a filter).

For instance, a subscriber 91-93 may be interested in all stock quote services listed. The details are held for each subscriber's subscriptions in table 85 and details of the entries returned as a result of the subscriptions received are held in match table 80. One embodiment illustrating match table 80 is illustrated in more detail in FIG.

Figure 1B:
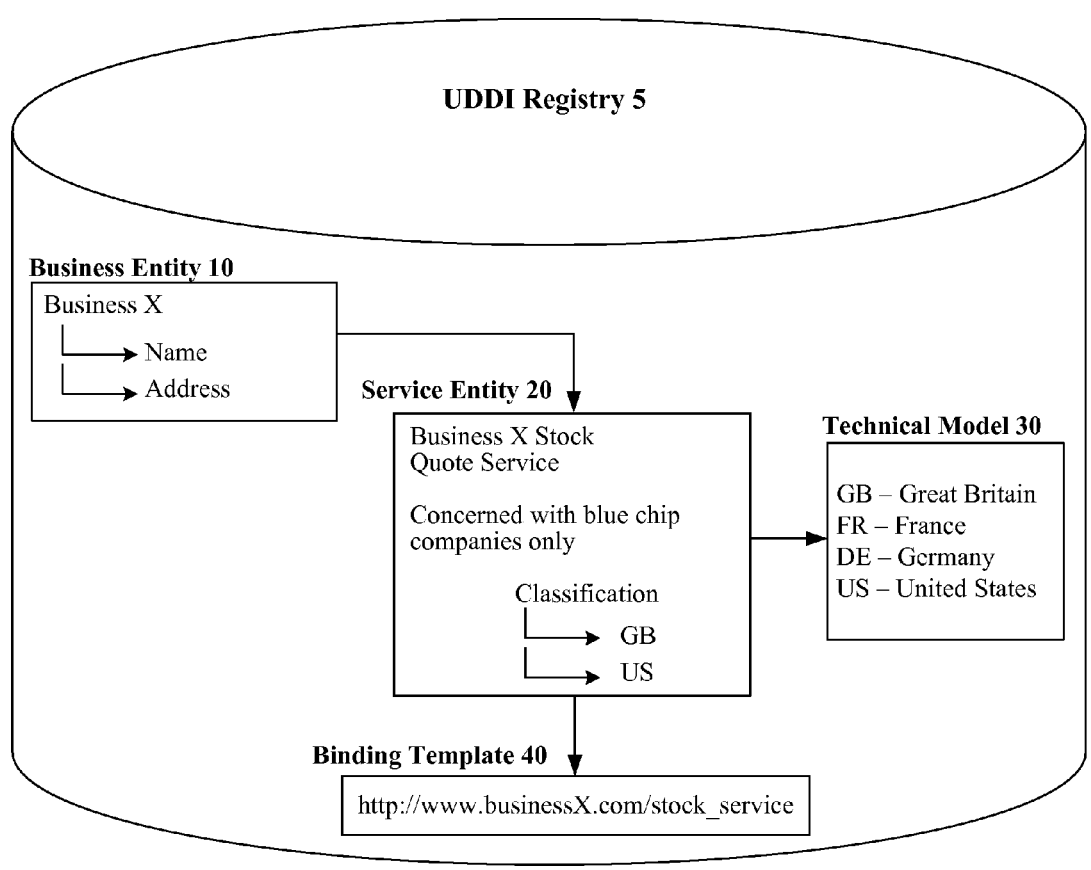
FIG. 1b illustrates in more detail, in accordance with a preferred embodiment of the present invention, the UDDI registry of FIG. 1b.
Figure 2:
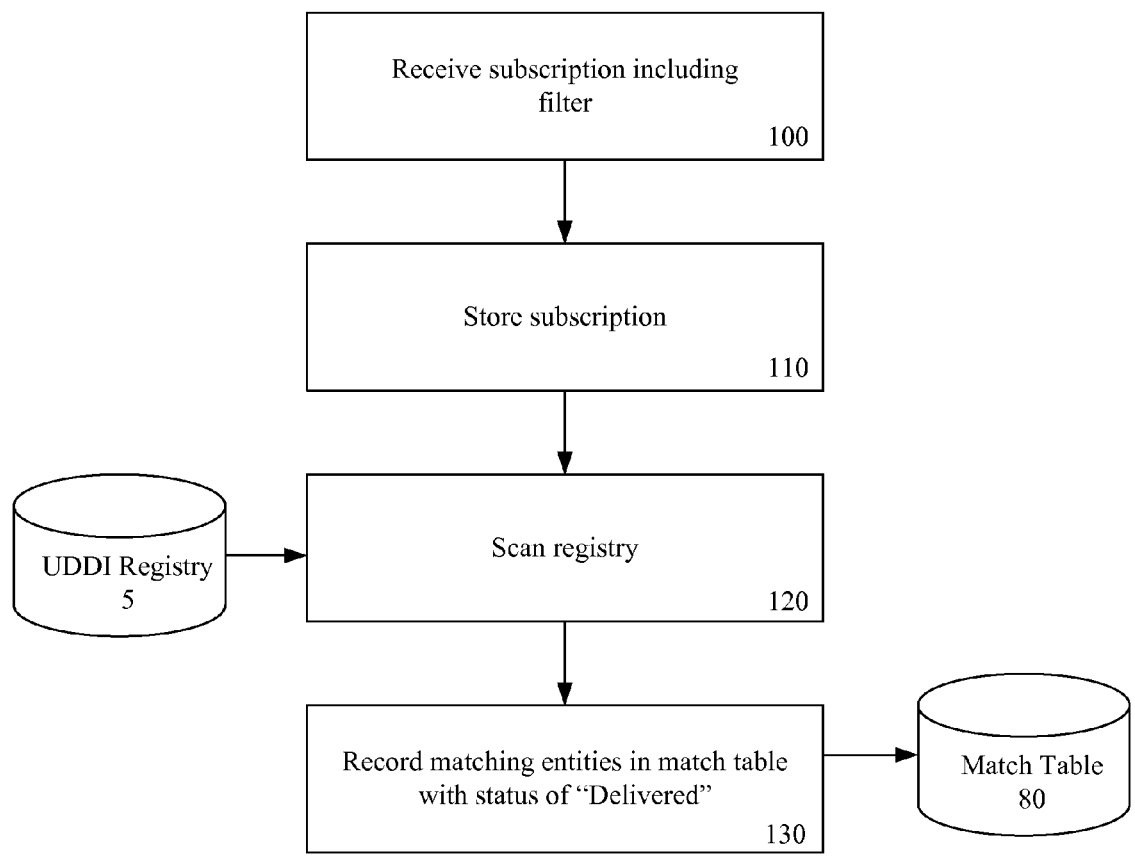
FIG. 2 is a flowchart of the processing for determining, in accordance with a preferred embodiment of the present invention, which entities match a received subscription filter.

FIG. 1b illustrates one embodiment of the UDDI registry 5. The embodiment conforms with the Oasis UDDI v 3.02 specification that defines the format of information held in a UDDI registry 5. The invention is not limited to this version of an Oasis specification, which is provided to show that the solution can be adapted to remain in conformance with any existing standard, such as Oasis UDDI v 3.02. The Oasis specification specifies that a UDDI registry may contain business and service entities, technical models and binding templates.

Business entity 10 provides information about a business (publisher 81, 82, 83) providing a particular service. The business entity element may include, for example, the business' name and its address. Each business entity 10 is then linked with one or more service entities 20. A service entity 20 provides information on a particular service that that business provides. For example, Business X might provide a stock quote service. The definition of this service provided by entity 20 may include a description of the service (e.g. business' X's service is concerned with blue chip companies only), along with some classification information. The classification information may, for example, indicate the countries for which the service holds stock information.

Service entity 20 is linked to one or more technical models 30. A technical model 30 defines the format of the information that may appear in the service entity 20. For example, technical model 30 may provide information about the countries that are listed in service entity 20.

Finally binding template 40 indicates where a particular service is located. So, as discussed above, subscribers may create a subscription scoped appropriately using a filter. When such a subscription is received (step 100) at system 50, it is stored in subscription table 85 (step 110). The UDDI registry 5 is then scanned using the information received (step 120). This is achieved by the subscription API 60 issuing a request via inquiry API 70. Any entities in the UDDI registry 5 which match are recorded in match table 80 with a status of "delivered" (step 130). In UDDI such entities may, by way of example only, be business entities, service entities, technical models, and binding templates.

The match table can include a set of columns, one of which is a delivered column. This is to indicate to the system that there is no need to deliver information about a matching entity to the subscriber. A delivered status is indicated by setting a flag from 0 to 1. The reason that matching entities are listed as delivered is because it is assumed that the subscriber does not want to know about those entities that match at the time of subscription since this can be achieved via a one-time query using API 70. Rather it is assumed that the subscriber is interested in those matching entities which have been inserted post subscription or matching entities which have been updated or deleted post subscription, via the publication API 65. This is however only one implementation and no limitation is in any way intended.

Thus match table 80 contains a list of entities returned as a result of applying subscribers' subscription requests when scanning the UDDI registry 5. (As indicated above, in the exemplary embodiment, such entities are services but they could equally also be business entities, technical models or binding templates). Each returned entity is listed in the entity key field and is associated with the requesting subscriber's subscription(s) using a globally unique subscription identifier (subscription key). Detail pertaining to each subscription identifier is stored in subscriptions' table 85. The subscriptions' table 85 contains a subscription identifier (subscription key), the search (filter) criteria expressed as a UDDI Inquiry API request, and the owning subscriber. An entity key may exist multiple times for each subscription that the entity relates to.

Having entered subscriptions with system 50, associated subscribers are now registered to be notified of interesting changes to the UDDI registry 5. When such a change occurs, this may result in an entity in the match table 80 no longer being pertinent to a subscriber's subscription. For example, a subscriber might have registered a subscription with respect to stock quote services providing information on foreign stock. Such a subscription might result in one entity only being listed in the match table. If the owning business decides to shut down its foreign arm of the business, then the stock quote service which was previously relevant might no longer be of interest. The entity is thus said to have been virtually deleted. In other words, the entity still exists within the UDDI registry but is no longer relevant to a previously interested subscriber. The invention is concerned with a mechanism for capturing such virtual delete information and other update information in an efficient manner.

A virtual delete occurs as a result of an update to the UDDI registry. It does not occur as a result of an insert to the UDDI registry. The update resulting in the virtual delete relates to a change in entity values, which causes a previously established relationship (subscription service having subscription filters) to be no longer valid.

It would be possible (although not particularly feasible) to determine whether an update was a virtual delete immediately upon receipt of the update. This would involve comparing the updated entity against all the subscription filters held in Subscriptions' Table 85 to determine whether the registered subscriptions still yielded the updated entity. This would be extremely time consuming and processor intensive.

Figure 3:
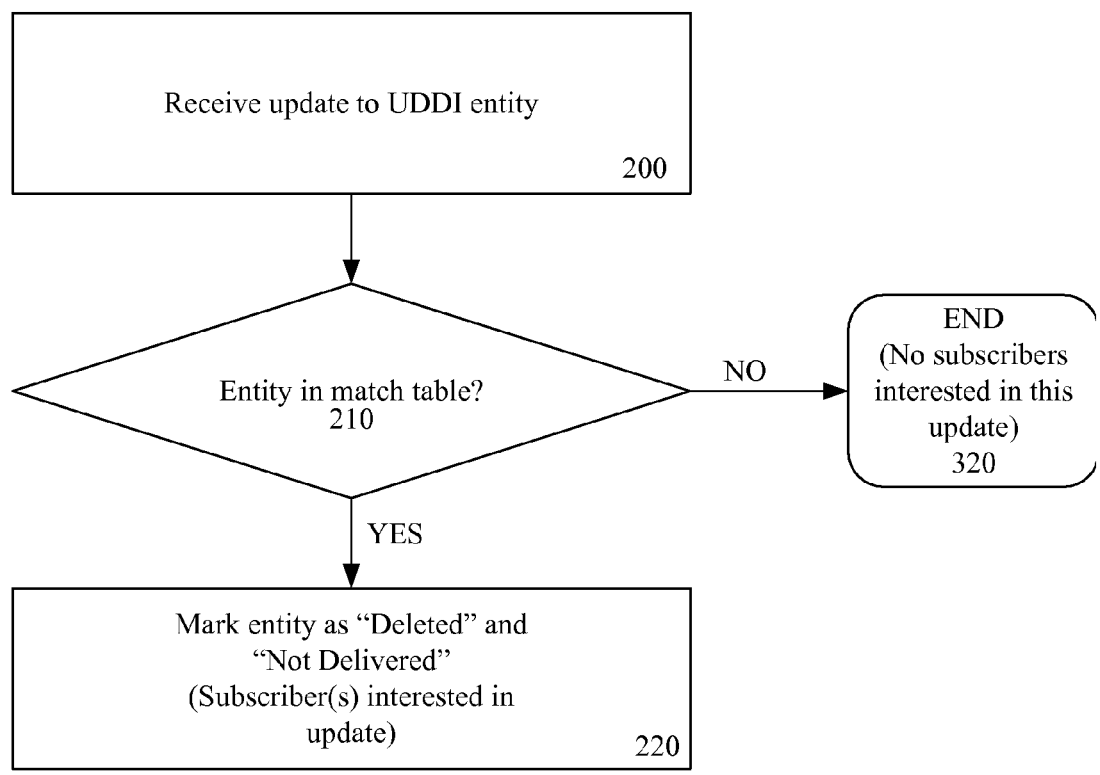
FIG. 3 shows, in accordance with a preferred embodiment of the present invention, the processing following the receipt of an update to a UDDI entity.

FIG. 3 illustrates the processing that preferably occurs when an entity within the UDDI registry is updated in accordance with an embodiment of the invention. FIG. 6 will also be referenced.

An update to an entity in the UDDI registry is received by receiver component 400 of FIG. 6 at step 200. In other words, data is published via publication API 65 to the UDDI registry and if this data relates to an entity that already exists within the registry, then the publication is deemed to be an update.

It is determined (determiner 410) at step 210 whether the entity is in match table 80. If the answer is no, this means that the system has no subscribers interested in this update so the process ends (step 230). On the other hand, an answer of yes means that the system does have subscribers interested in this update. At this point it is not known whether this update is a true update, a delete, or a virtual delete. Irrespective, associated subscribers should be notified. Rather than perform the notifying immediately, the entity is marked (match table editor 420) within the match table as "deleted" and "not delivered". This is achieved by setting the appropriate deleted flag in the match table to 1 and the appropriate delivery flag to 0. No specific analysis is performed at this point in time in order to determine the type of update received by the UDDI registry. This makes processing much more efficient. A status of "not delivered" is marked to indicate that subscribers should at some point be informed of the update. The process of informing subscribers could be as a result of a periodic scan or in response to a specific subscriber's request. This process will be described with reference to FIG. 4. Again, FIG. 6 will also be referenced.

As indicated above, periodically there will be the need to resolve the status flags indicated by the match table to their proper status and to notify subscribers of changed entities. This may be as a result of a scheduled scan or due to a one-time request from a particular subscriber(s).

At step 300 the UDDI registry is scanned for filter matches (scan component 430). If no entities are returned, then the process ends at step 320. Assuming an entity is found, then it is examined (examiner 440; step 330). It is then determined (determiner 410) whether the entity is already in the match table (step 340). If the answer is no, then an insert to the UDDI registry has been found. The matching entity is recorded in the match table as "inserted" and "not delivered" (match table editor 420; step 350). A status of inserted is indicated in the match table by setting the appropriate insert flag to 1 and the appropriate delivery flag to 0 (FIG. 5). Assuming there are more entities found, the process then loops.

If it is determined (determiner 410) at step 340 that the entity is already in the match table, then it is determined (determiner 410) whether the entity found has a status of not (−) delivered at step 345. If the answer is no, then the process loops. If the answer is yes, then the corresponding entity in the match table 80 is modified (by match table editor 420) to set the deleted flag to 0 and to set the updated flag to 1. In other words, since the entity was returned as a result of applying registered subscriptions to the UDDI registry, the entity must either be an insert or an update. It cannot have been deleted (virtually or otherwise) since then it would not have been returned as a result of the scan. Since the entity is already in the match table (i.e. was returned previously), the correct status must be that of updated.

Those entities that are not returned as a result of the scan but were already in the match table will be left alone. As a result of the processing illustrated with respect to FIG. 3, such entities will already have been marked in the match table 80 as "deleted" and "not delivered".

Having marked an entity as "updated", the process then loops round to deal with any additional entities returned as result of the scan (step 370). If there are none, then the match table is analysed in association with the subscriptions' table (analyser 450) and the filter owner (FIG. 5) is notified (notifier 460) of all "not delivered" entities with a status of "inserted"; "updated" or "deleted" (step 380). Deleted will include virtual and real deletes. In one embodiment, no distinction is made to the filter owner (subscriber) between the two types of deletes. Finally, such notified matching entities are then recorded as "delivered" in match table 80 (match table editor 420; step 390).

Note, while the match table has been illustrated as including updated (U), deleted (D) and inserted (I) columns, it would be equally possible to have a single action column with an indicator of I, U or D. The match table itself could, by way of example, be an in-memory collection or a database table.

Figure 4:
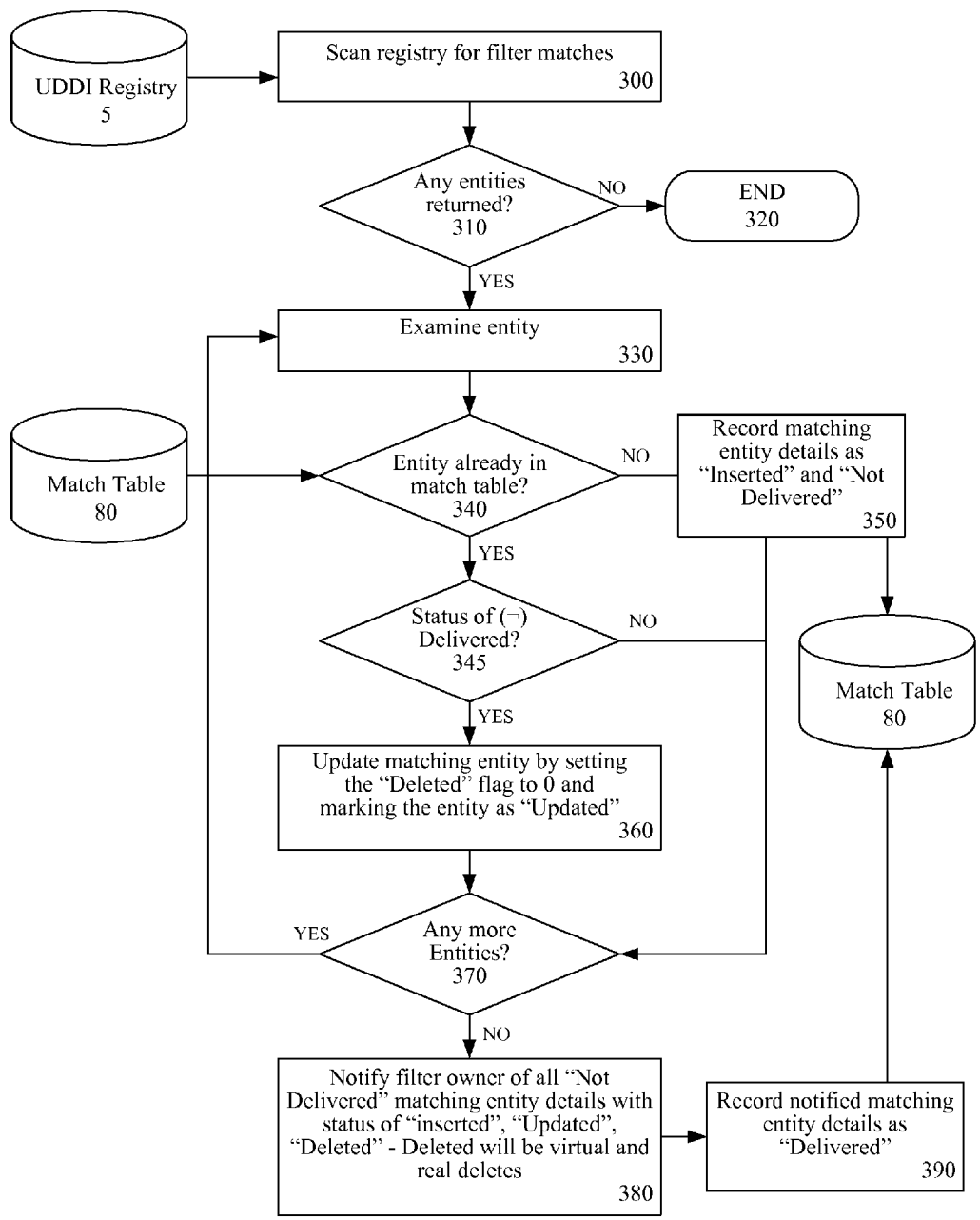
FIG. 4 shows, in accordance with a preferred embodiment of the present invention, the processing performed as a result of a one-off or periodic scan of the UDDI registry for changes thereto.

It should be appreciated that FIG. 4 illustrates the process for one subscription only. The process should naturally be run for each subscription contained in subscriptions' table 85.

It should be appreciated that whilst the present invention has been described in terms of UDDI, the invention is not limited to such. Rather the invention is applicable to any situation where it is desirable to capture information on changes to a datastore. The datastore could be a database or an in memory representation. Further, whilst the invention has been described in terms of changes to service entities held in a registry, the invention is applicable to any data held in a datastore.

The invention has been discussed in terms of deleting entities from a datastore. In UDDI such entities may, by way of example only, be business entities, service entities, technical models and binding templates. Many of the entities are related to one another and thus deletion of a business entity will preferably results in deletion of all associated service entities and those binding templates. Technical models are not owned by a business or service entity, they are only associated to entities. Thus deletion does not cascade down to technical models.

The embodiment as discussed does not make a distinction between real and virtual deletes. In another embodiment, such a distinction is made. All updates, when received, are initially marked in the match table as having been virtually deleted. When a delete request is received for an entity within the datastore, it is determined whether that entity is in the datastore and the entry within the match table is modified to indicate that the entity really has been deleted. When a periodic or specifically requested scan of the UDDI registry is done, processing is as per FIG. 4. Those entities that are still returned are modified from their virtual delete status to that of 'updated'. Whilst this embodiment involves slightly more processing, this is still an efficient way of capturing update information. Virtually deleted items are particularly difficult to determine and by assuming that all updates are virtual deletes, it is not necessary to perform more processor intensive analysis on an update by update basis. It is further not necessary to attempt to discover whether a previously returned entity is no longer relevant as a result of an update to that entity. Whether an entity has been virtually deleted can be inferred via the process of elimination discussed.

Finally, the embodiment has been discussed in terms of notifying subscribers of changes to a datastore. The notification itself is not an essential part of the invention. Once an entity status has been determined, such a status could then be used to initiate another action. For example, calling a web service which monitors the activity in a UDDI registry and which could increment one of a number counters. These counters could then be used (perhaps by a separate program) to present a summary of the activity to a subscriber which could include the total number of new services, updated services, and deleted services, etc.

The diagrams in FIGS. 1-6 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for handling Universal Description, Discovery and Integration (UDDI) updates to entities, the method comprising:

receiving, via at least one processor executing computer program code that is stored on at least one non-transitory storage medium, at least one update to be applied to a UDDI entity within a UDDI registry, which comprises a non-transitory storage medium;

applying, via at least one processor executing computer program code that is stored on at least one non-transitory storage medium, each received update to the UDDI entity;

determining, via at least one processor executing computer program code that is stored on at least one non-transitory storage medium, using a match table whether there is a subscriber interested in the entity for which the update has been received, wherein the match table lists those entities within the UDDI registry which are of interest to one or more subscribers;

for each subscriber listed in the match table for which an interested in the entity is determined, associating ,via at least one processor executing computer program code that is stored on at least one non-transitory storage medium, a status indicator for the entity within the UDDI registry that indicates that a subscription between the subscriber and the entity has been deleted;

wherein the change to the status indicator negates a need that would otherwise exist to scan the subscriptions associated with the entity for each received update to the entity;

for each subscriber listed in the match table for which an interested in the entity is determined, associating, via at least one processor executing computer program code that is stored on at least one non- transitory storage medium, a status indicator for the entity that indicates that a subscription between the subscriber and the entity has been deleted;

in addition to associating the entity for which an update has been received with a status indicator of deleted for subscriber specific records of the UDDI registry, associating the entity in the subscriber specific records of the UDDI registry with a status flag indicating that subscribers have not been notified of the change in subscription status related to the entity; and utilizing, via at least one processor executing computer program code that is stored on at least one non-transitory storage medium, the status flag during a batch process of a plurality of updates to UDDI entities to determine whether a notification of a subscription change is to be conveyed to a related subscriber.

2. The method of claim 1, further comprising:
conveying, via at least one processor executing computer program code that is stored on at least one non-transitory storage medium, notifications in batch to each of the subscribers having a corresponding status flag that indicates a notification is to be sent.

3. The method of claim 1, wherein the at least one update comprises a plurality of updates, wherein the at least one subscriber comprises a plurality of subscribers, said method further comprising:
processing the plurality of updates in batch to determine if any of the subscriptions indicated as deleted responsive to the changing steps are still valid subscriptions based upon related subscription specifics; and
for each still valid subscription, changing the status indicator from deleted to an indicator that the subscription to the entity is active.

4. The method of claim 3, wherein at least a portion of the subscription specifics comprise subscription filters, wherein said subscription filters comprise conditions of the entity, which are subject to change based upon said received updates.

5. The method of claim 3, further comprising:
sending notifications to a subset of subscribers subsequent to the processing step, wherein said subset of subscribers comprise those subscribers whose status indicator of deleted remains deleted due to the previous subscriptions being invalidated by one or more of the updates, wherein the notifications indicate that the previous subscription has been deleted.

6. The method of claim 1, further comprising:
handling the update processing for the received update in batch with other updates to entities at a same time as new entities are compared against subscription criteria to determine whether new subscriptions exist for the new entities.

7. The method of claim 1, further comprising:
handling the update processing for the received update in batch with other updates to entities at a same time as changes to subscriptions having subscription filters are processed to determine which of the entities comprising said UDDI entity are associated with the subscriptions, including those subscriptions having subscription filter changes.

8. A computer program product for calculating for handling Universal Description, Discovery and Integration (UDDI) updates to entities, the computer program product comprising:
a non-transitory computer usable storage medium having computer usable program code embodied therewith, the computer usable program code comprising:
computer usable program code configured to receive at least one update to be applied to a UDDI entity within a UDDI registry;
computer usable program code configured to apply each received update to the UDDI entity, wherein the update changes records associated with at least one UDDI entity of the UDDI registry to indicate at least one subscriber is affected by the update;
computer usable program code configured to detect at least one subscriber of the entity by searching the records of the UDDI registry;
computer usable program code configured to change a status indicator within UDDI records of the UDDI registry for each detected subscriber of the UDDI entity to indicate that a subscription to the entity has been deleted, wherein the change to the status indicator negates a need that would otherwise exist to scan the subscriptions associated with the entity for each received update to the entity; and
computer usable program code configured to send notifications to a subset of subscribers associated with a changed status indicator, wherein said subset of subscribers comprise those subscribers whose status indicator of deleted remains deleted due to the previous subscriptions being invalidated by one or more of the updates, wherein the notifications indicate that the previous subscription has been deleted.

9. The computer program product of claim 8, further comprising:
computer usable program code configured to change a notification indicator for the subscriber and the entity indicating that a change to the entity has occurred and that the subscriber has not been notified of the change.

10. The computer program product of claim 8, wherein the at least one update comprises a plurality of updates, wherein the at least one subscriber comprises a plurality of subscribers, said method further comprising:
computer usable program code configured to process the plurality of updates in batch to determine if any of the subscriptions indicated as deleted responsive to the changing steps are still valid subscriptions based upon related subscription specifics; and
computer usable program code configured to change the status indicator from deleted to an indicator that the subscription to the entity is active for each still valid subscription.

11. The computer program product of claim 10, wherein at least a portion of the subscription specifics comprise subscription filters, wherein said subscription filters comprise conditions of the entity, which are subject to change based upon said received updates said received updates.

12. The computer program product claim 8, further comprising:
computer usable program code configured to handle the update processing for the received update in batch with other updates to entities at a same time as new entities are compared against subscription criteria to determine whether new subscriptions exist for the new entities.

13. The computer program product claim 8, further comprising:
computer usable program code configured to handle the update processing for the received update in batch with other updates to entities at a same time as changes to subscriptions having subscription filters are processed to determine which of the entities comprising said UDDI entity are associated with the subscriptions, including those subscriptions having subscription filter changes.

14. A method for capturing information on changes in a UDDI registry, the method comprising:
receiving via at least one processor executing computer program code that is stored on at least one non-transitory storage medium, an update to be applied to an entity with a UDDI registry, wherein applying the update modifies records of the UDDI registry associated with the entity;
determining via at least one processor executing computer program code that is stored on at least one non-transitory storage medium, using a match table and the records of the UDDI registry whether there is a subscriber interested in the entity for which the update has been received, wherein the match table lists those entities within the UDDI registry which are of interest to one or more subscribers; and for each subscriber listed in the match table for which an interested in the entity is determined, associating via at least one processor executing computer program code that is stored on at least one non-transitory storage medium, a status indicator for the entity within the records of the UDDI registry that indicates that a subscription between the subscriber and the entity has been deleted;

repeating the receiving, determining, and associating steps for a plurality of updates;

performing a batch process involving all of the u s dates to determine which of the status indicators indicated as deleted are to be changed to indicate an active subscription involving the associated subscriber and the entity exists; and changing those status indicators to active as appropriate in accordance with the batch process, wherein changing the status indicators within the records of the UDDI registry to a deleted value negates a need that would otherwise exist to scan records of the UDDI registry for subscriptions associated with the entity for each received update related to the entity.

15. The method of claim 14, wherein at least a portion of the subscriptions involved in the batch process comprise subscription filters, wherein said subscription filters comprise conditions relating to the updated entity, wherein said conditions of the subscription filters are subject to change when the entity is updated in accordance with the received update.

16. The method of claim 14, wherein in addition to associating the entity for which an update has been received with a status indicator of deleted, the method further comprises:

associating the entity with a status flag indicating that subscribers have not been of the change in subscription status related to the entity.

17. The method of claim 16, further comprising:

utilizing the status flag during a batch process of a plurality of updates to UDDI entities to determine whether a notification of a subscription change is to be conveyed to a related subscriber.

\* \* \* \* \*